United States Patent
Olivera Navarro

(10) Patent No.: US 12,539,809 B2
(45) Date of Patent: Feb. 3, 2026

(54) METHOD FOR CONTROLLING LIGHTING IN A ROOF AND ROLLO ASSEMBLY

(71) Applicant: INALFA ROOF SYSTEMS GROUP B.V., Oostrum (NL)

(72) Inventor: Jorge Alberto Olivera Navarro, Nijmegen (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 2 days.

(21) Appl. No.: 18/806,646

(22) Filed: Aug. 15, 2024

(65) Prior Publication Data
US 2025/0058708 A1    Feb. 20, 2025

(30) Foreign Application Priority Data

Aug. 18, 2023 (CN) .......................... 202311052419.7

(51) Int. Cl.
| | |
|---|---|
| *B60Q 3/80* | (2017.01) |
| *B60J 1/20* | (2006.01) |
| *B60J 7/043* | (2006.01) |
| *B60Q 3/208* | (2017.01) |
| *B60Q 3/70* | (2017.01) |

(52) U.S. Cl.
CPC .............. *B60Q 3/80* (2017.02); *B60J 1/2013* (2013.01); *B60J 7/043* (2013.01); *B60Q 3/208* (2017.02); *B60Q 3/70* (2017.02)

(58) Field of Classification Search
CPC ... B60Q 3/80; B60Q 3/208; B60Q 3/70; B60J 1/2013; B60J 7/043; B60J 1/2016; B60J 1/2052; B60J 3/04; B60J 7/0015; B60J 7/0007

See application file for complete search history.

(56) References Cited

U.S. PATENT DOCUMENTS

| | | | |
|---|---|---|---|
| 10,507,763 B2 * | 12/2019 | Park | B60Q 3/208 |
| 10,625,668 B2 | 4/2020 | Oshina | |
| 12,049,166 B2 | 7/2024 | van Boxtel | |

(Continued)

FOREIGN PATENT DOCUMENTS

| | | |
|---|---|---|
| CN | 210478519 U | 5/2020 |
| CN | 211195806 U | 8/2020 |

(Continued)

OTHER PUBLICATIONS

Search Report in corresponding European Application No. 24188627.4 dated Dec. 13, 2024.

*Primary Examiner* — Sizo B Vilakazi
(74) *Attorney, Agent, or Firm* — Steven M. Koehler; Westman, Champlin & Koehler, P.A.

(57) ABSTRACT

A rollo assembly for a vehicle includes a roof panel provided with glass light, a rollo screen movable between a closed position and an opened position, in Guide Light; and a control unit. The control unit is configured to: upon movement of the rollo screen to the opened position, adapt lighting by decreasing in Guide Light and increasing glass light. The control unit may further be configured to, upon movement of the rollo screen to the closed position, adapt lighting by decreasing glass light and increasing in Guide light. Wherein adapting lighting comprises gradually changing the amount of light emitted by the in Guide Light and the glass light.

15 Claims, 5 Drawing Sheets

(56) References Cited

U.S. PATENT DOCUMENTS

| | | | |
|---|---|---|---|
| 2010/0080010 A1* | 4/2010 | Marui | B60Q 3/20 362/488 |
| 2019/0135170 A1* | 5/2019 | Salter | B60Q 3/20 |
| 2019/0184895 A1* | 6/2019 | Oshina | B60Q 3/208 |
| 2020/0164727 A1* | 5/2020 | Hiemstra | B60Q 3/208 |
| 2022/0097502 A1* | 3/2022 | van Boxtel | B60Q 3/208 |

FOREIGN PATENT DOCUMENTS

| | | |
|---|---|---|
| CN | 214215450 U | 9/2021 |
| DE | 10055561 A1 | 5/2002 |
| DE | 102009038483 A1 | 2/2011 |
| DE | 102011103319 A1 | 12/2011 |
| DE | 102015210977 A1 | 12/2016 |
| DE | 102016101873 A1 | 8/2017 |
| DE | 102017202924 A1 | 8/2018 |
| DE | 202017106805 U1 | 2/2019 |
| DE | 202018106291 U1 | 2/2019 |
| EP | 2287042 A1 | 2/2011 |
| EP | 2454110 B1 | 6/2013 |
| EP | 3978312 A1 | 4/2022 |
| FR | 2886238 A1 | 12/2006 |
| JP | H03100540 U | 10/1991 |
| JP | 2014088075 A | 5/2014 |
| JP | 2017043225 A | 3/2017 |
| WO | 2018206600 A1 | 11/2018 |

* cited by examiner

METHOD FOR CONTROLLING LIGHTING IN A ROOF AND ROLLO ASSEMBLY

CROSS-REFERENCE TO RELATED APPLICATION

The present application is based on and claims the benefit of Chinese patent application Serial No. 202311052419.7, filed Aug. 18, 2023, the content of which is hereby incorporated by reference in its entirety.

BACKGROUND

The discussion below is merely provided for general background information and is not intended to be used as an aid in determining the scope of the claimed subject matter.

The present invention relates to a method for controlling lighting in a vehicle provided with a sun blind and a lighting arrangement and in particular to such a sun blind as part of a roof and rollo assembly of a vehicle. The invention further relates to a control unit for controlling the lighting arrangement of such assembly and more in particular to a control unit for controlling the lighting arrangement of the sun blind and the lighting of a glass panel of the roof assembly.

Sun blinds for vehicle roof assemblies are known per se, especially when the roof assembly is equipped with a glass panel. Such sun blinds are commonly referred to as a rollo, which name is derived from the movement when closing and or opening the sun blind during which it rolls in or out respectively in parallel along the roof assembly or more in particular the glass panel thereof. Such a rollo will have a closed position, wherein it covers the glass panel thereby blocking the interior of a vehicle from light from outside, and an open position uncovering the glass roof panel. In turn glass roof assemblies may include fixed panels and/or sliding panels, which each may include a glass panel. Such a glass panel may include switchable glazing i.e. switchable glass which may be switched between a transparent state and an opaque i.e. light blocking state and/or it may include "Light in Glass", meaning a glass panel into which light from a light source may be coupled in and coupled out at predetermined locations to provide a glare or lighting effect in dependence of the illumination of the light source.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in deter-mining the scope of the claimed subject matter. The claimed subject matter is not limited to implementations that solve any or all disadvantages noted in the Background.

As operating the rollo between the closed position and the open position affects the interior lighting of the vehicle, there is a need for further enhancement of the operation thereof.

According to one aspect, there is provided a method for controlling lighting in a roof and rollo assembly, the roof and rollo assembly including a roof panel provided with glass light, a rollo screen movable between a closed position and an opened position, and in Guide Lighting. The method includes activating in Guide Light, upon receiving an "open blind" signal, moving the rollo screen in a first lengthwise direction to the opened position and upon moving the rollo screen to the opened position, adapting lighting by decreasing in Guide Light and increasing glass light. The method may further include upon receiving a "close blind" signal, moving the rollo screen in a second lengthwise direction opposite to the first lengthwise direction, to the closed position and upon moving the rollo screen to the closed position, adapting lighting by decreasing glass light and increasing in Guide light. Wherein adapting lighting includes gradually changing the amount of light emitted by the in Guide Light and the glass light.

According to a further aspect, wherein the roof panel includes a movable panel, there is provided a method further including, upon receiving an "open roof" signal, moving the movable roof panel to an opened position, upon moving the movable roof panel to the opened position, decreasing the glass light. And in a further aspect, the method may further include, upon receiving a "close roof" signal, moving the movable roof panel to a closed position, and upon moving the movable roof panel to the closed position, increasing the glass light.

According to a further aspect, there is provided a control unit for a roof and rollo assembly for a vehicle, configured for executing the methods as disclosed.

According to another aspect, there is provided a roof and rollo assembly for a vehicle, including a roof panel provided with glass light, a rollo screen movable between a closed position and an opened position, in Guide Light and a control unit. Wherein the control unit is configured to activate in Guide Light, upon receipt of an "open blind" signal, move the rollo screen in a first lengthwise direction to the opened position, upon movement of the rollo screen to the opened position, adapt lighting by decreasing in Guide Light and increasing glass light. And wherein adapting lighting includes gradually changing the amount of light emitted by the in Guide Light and the glass light.

According to yet another further aspect, there is provided a roof and rollo assembly, wherein the control unit is further configured for, upon receipt of a "close blind" signal, move the rollo screen in a second lengthwise direction, opposite to the first lengthwise direction, to the closed position, and upon movement of the rollo screen to the closed position, adapt lighting by decreasing glass light and increasing in Guide light.

According to a further aspect, the in guide Light and the glass light of the roof and rollo assembly are provided with power from the same power source.

Throughout the description a glass roof panel or simply glass panel is described as being able to include a glass light, more generally referred to as a light device, which may refer to both Light in Glass as well as switchable glazing.

Particular embodiments of the invention are set forth in the dependent claims.

Further objects, aspects, effects and details of particular embodiments of the invention are described in the following detailed description of a number of exemplary embodiments, with reference to the drawings.

BRIEF DESCRIPTION OF THE DRAWINGS

By way of example only, the embodiments of the present disclosure will be described with reference to the accompanying drawings, wherein.

DETAILED DESCRIPTION OF ILLUSTRATIVE EMBODIMENTS

Figure 1A:
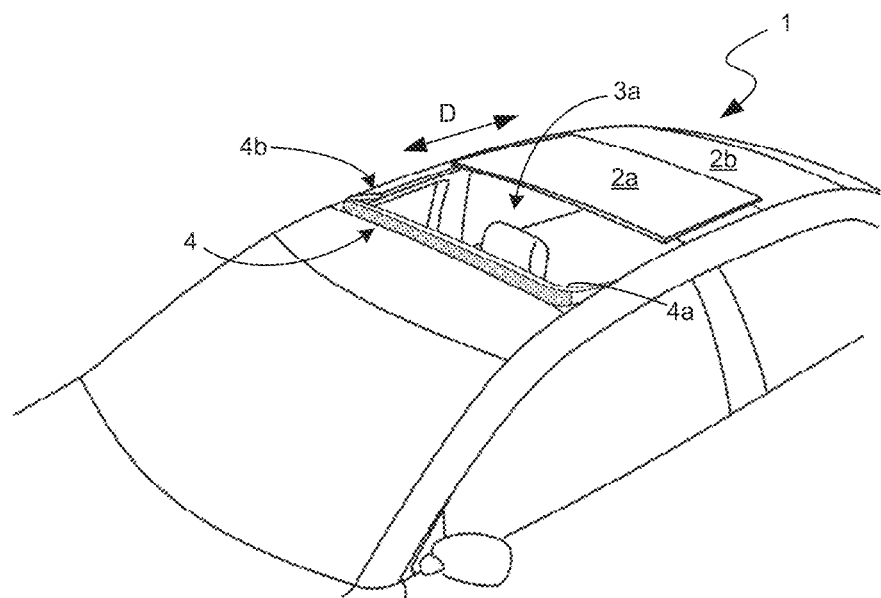
FIG. 1A illustrates a perspective view of an example of a vehicle roof with an open roof assembly.
Figure 1B:
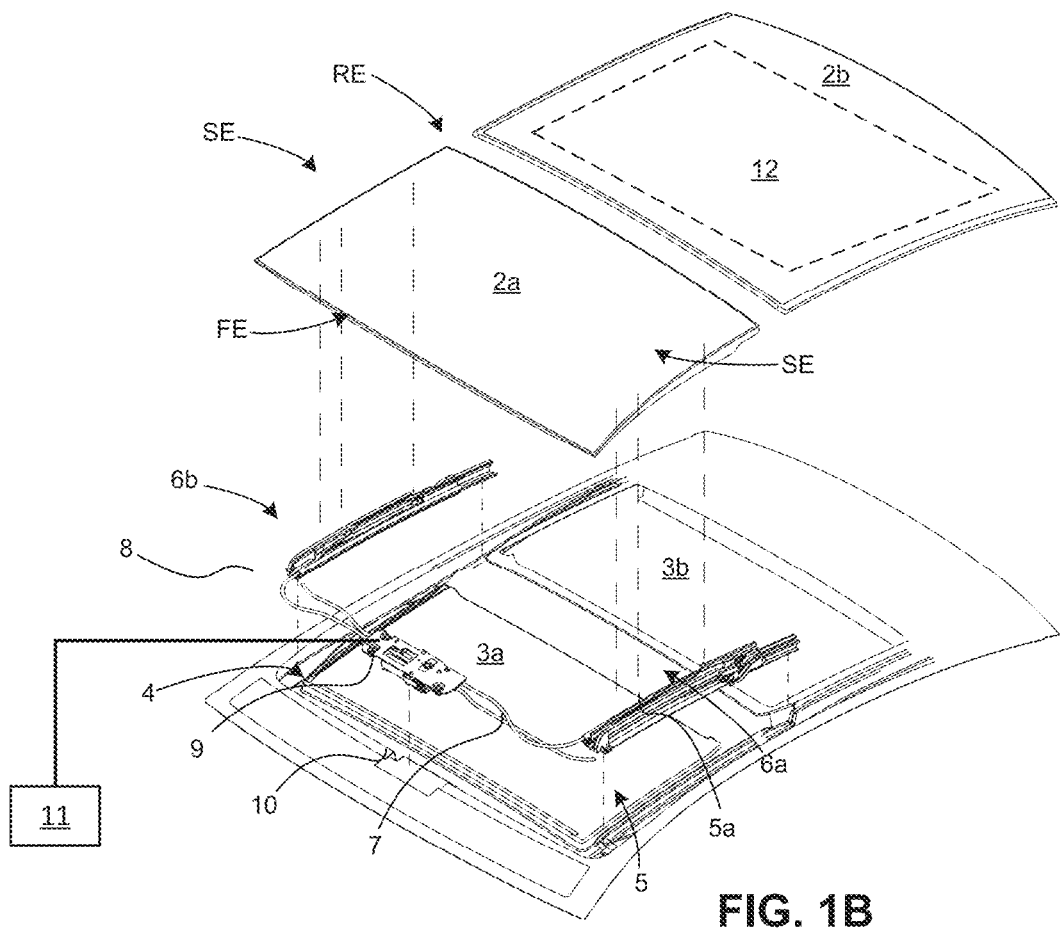
FIG. 1B illustrates an exploded view of the open roof assembly of FIG. 1A.

FIGS. 1A and 1B illustrate a vehicle roof having an open roof assembly 1 arranged therein. The open roof assembly 1 comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed. In the open position, for example both the rear end RE and front end FE may be raised as compared to the closed position.

It is noted that the illustrated vehicle roof 1 corresponds to a passenger car. The present invention is however not limited to passenger cars. Any other kind of vehicles that may be provided with a moveable panel are contemplated as well.

FIG. 1B illustrates the same vehicle roof as shown in FIG. 1A having panels 2a and 2b. In particular, while FIG. 1A shows the open roof assembly 1 in the open position, FIG. 1B is an exploded view of the open roof assembly 1 in a closed position. Further, in this exploded view of FIG. 1B, it is shown that there is a second roof opening 3b. The first and second roof openings 3a, 3b are provided in a frame 5 of the open roof assembly 1. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly 1.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to the open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8, and a drive motor 9. The first and second guide assemblies 6a, 6b are arranged on respective side ends SE of the moveable panel 2a and may each comprise a guide and a mechanism. The guide is coupled to the frame 5, while the mechanism comprises moveable parts and is slidably moveable in the guide. The first and the second drive cables 7, 8 are provided between the mechanisms of the respective guide assemblies 6a, 6b and the drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted at a recess 10 near or below the front end FE of the moveable panel 2a in the closed position. In another embodiment, the drive motor 9 may be positioned at any other suitable position or location. For example, the drive motor 9 may be arranged near or below the rear end RE of the moveable panel 2a in the closed position or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly 1.

Figure 2A:
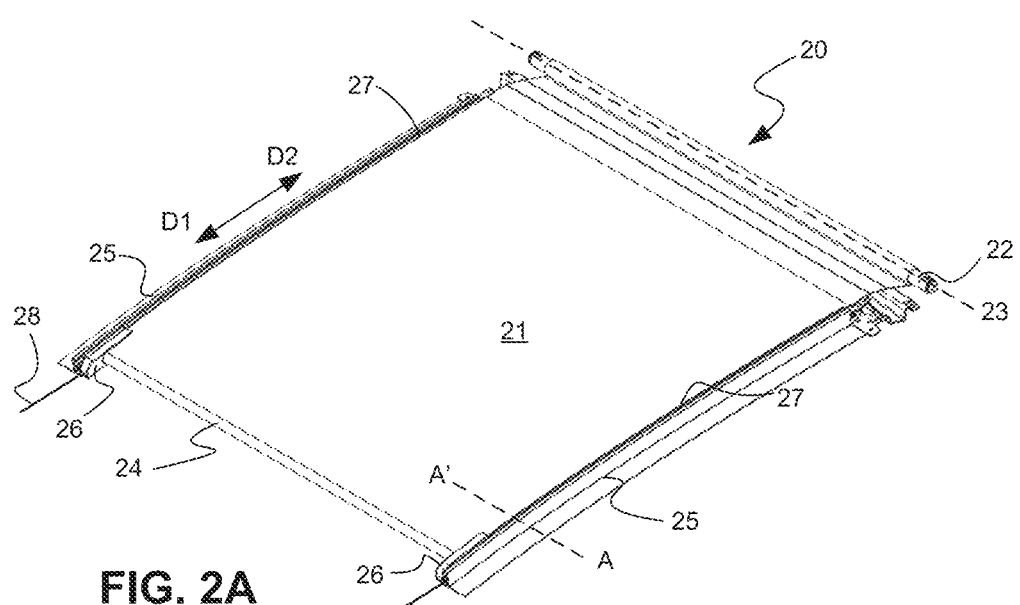
FIG. 2A illustrates a perspective view of an example of a rollo assembly in closed position for use with the roof assembly of FIG. 1A.
Figure 2B:
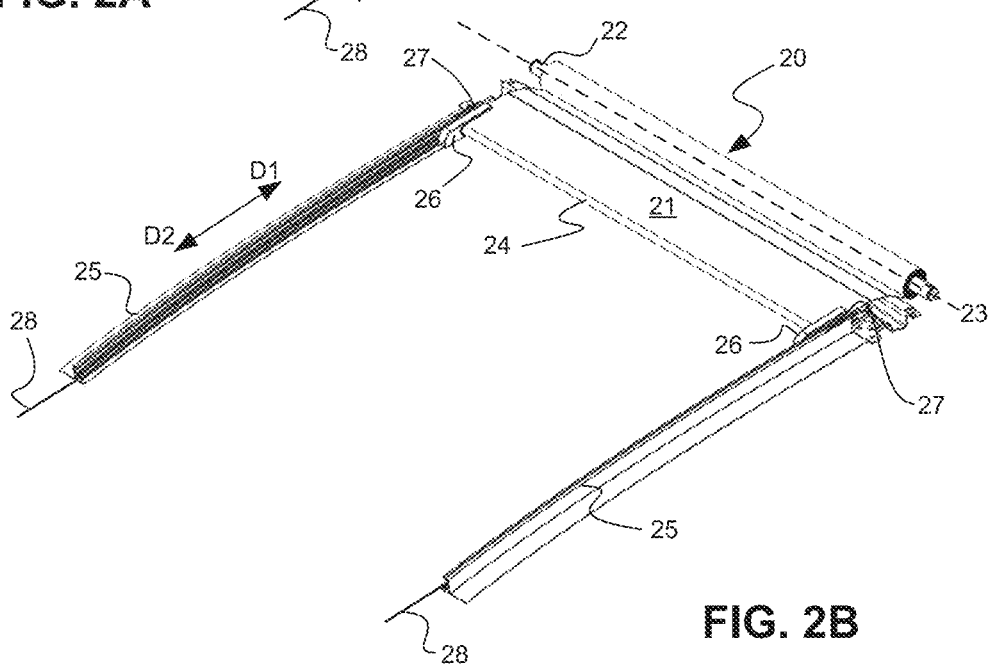
FIG. 2B illustrates the rollo assembly of FIG. 2A in a partially opened position.

Referring to FIGS. 2A and 2B, an example of a rollo assembly 20 is shown which may act as a sunscreen or sun blind assembly, and may for example be positioned below the movable roof panel 2a, or e.g. both the movable and fixed roof panels 2a, 2b. Thereto, it may be connected to the frame 5 of the roof assembly 1 of FIG. 1B, and it may form an integrated part of the roof assembly. In FIGS. 2A and 2B, the rollo assembly 20 is shown respectively in a closed position and a partially opened position. The rollo assembly 20 includes a rollo screen 21 and a winding shaft 22 which is rotatable around a stationary axis of rotation 23. The rollo screen 21 extends substantially in a first direction D1 and is connected to the winding shaft 22. In an opposite second direction D2, the rollo screen is connected to a front beam 24. The rollo assembly 20 further includes two parallel arranged rollo guides 25 and two sliders 26 connected to the front beam 24 and arranged for movably sliding along one of the rollo guides 25 respectively. Together with the sliders 26, two opposite longitudinal edges 27 of the rollo screen 21 are arranged in the guides 25 and for moving in coherence with the sliders 26 through the rollo guides 25. The rollo guides 25 further support the rollo screen 21 and keep it in a desired position. When moving from the closed position to a partially or fully opened position, the rollo screen 21 is wound up on the winding shaft 22 when rotated in a first direction. The front beam 24 is pulled by the sliders 26 slide along the rollo guides 25 in the first direction D1. When moving from the partially or fully opened position to the closed position, the rollo screen 21 is wound off from the winding shaft 22 when rotated in a second direction. The front beam 24 is pulled by the sliders 26 slide along the rollo guides 25 in the second direction D2. To further control the movement of the rollo screen 21, drive cables 28 may be connected to the sliders 26 for pulling or pushing the front beam 24 in the second direction D2 or first direction D1. The drive cables 28 may be operated by a drive cable motor similar to that of the roof assembly.

Figure 3:
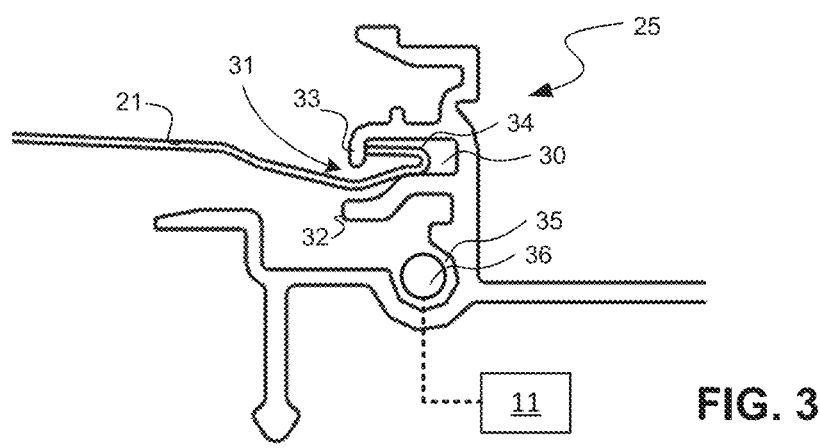
FIG. 3 illustrates a cross-section of the rollo assembly of FIG. 2A along line A-A'.

Referring to FIG. 3, a cross-section of the rollo assembly 21 along the line A-A' in FIG. 2A is illustrated, showing the cooperation between one of the rollo guides 25 and the rollo screen 21. The rollo guide 25 includes a holding groove 30 having a narrow entrance opening 31 formed by a lower and upper rib 32, 33. The entrance opening 31 is directed horizontally towards an opposed holding groove of the other rollo guide 25. The rollo screen 21 may have an upward fold 34 running along longitudinal edge 27 that is enclosed by the holding groove 30. The rollo assembly 20 further includes in Guide Light, in this embodiment provided by two light guides 35 which each support a light string 36, the light guides 35 being respectively arranged adjacent to one of the rollo guides 25 and running in parallel thereto. In some embodiments, the light guides 35 may be formed as an integral part of one of the respective roll guides 25. The light string 36 may be a transparent fiber with a light source coupled at one outer end thereof for coupling light into the light string 36. In other embodiments, the light string 36 may consist for example of multiple LEDs carried on a plastic strip. Thus, adjacent of either longitudinal side 27 of the rollo screen 21 a light string 36 is arranged.

In addition, to the in Guide Light provided by the light strips 36 in the light guides 35, the roof assembly may also include a glass lighting function, in dependence of the type of roof panels. For example, referring to FIG. 1B, at least one of the roof panels 2a, 2b may be provided with glass light 12, For example, referring to FIG. 1B, at least one of the roof panels 2a, 2b may be provided with glass light 12, indicated by a zone demarked by a dotted line in FIG. 1B. In one embodiment, the glass light 12 may include a Light in Glass panel wherein light is coupled into the glass panel near at least one side edge of the panel and coupled out at predetermined spots dispersed over the area of the panel. In another embodiment, the glass lighting function may include switchable glazing, meaning that the roof panel includes glass of which the transparency may be altered, which when activated i.e. in an ON state allows light to travel through and blocks light when de-activated i.e. in an OFF state. Such switchable glazing may include for example a polymer dispersed liquid crystal (PDLC) glass panel, able to switch between transparent and opaque states.

As mentioned above, at least one of the roof panels 2a, 2b may be provided with glass light 12, being either Light in Glass or switchable glazing. In addition, both panels 2a, 2b may be provided with different types of glass light. For example, the front movable panel 2a may include Light in Glass and the rear fixed panel 2b may include switchable glazing. Or, vice versa. In order to operate the glass light 12, the control unit 11 may be configured for activating and de-activating the glass light 12. The same control unit 11 may be used for activating and de-activating the in Guide Light 36, as seen in FIG. 3.

Figure 4A:
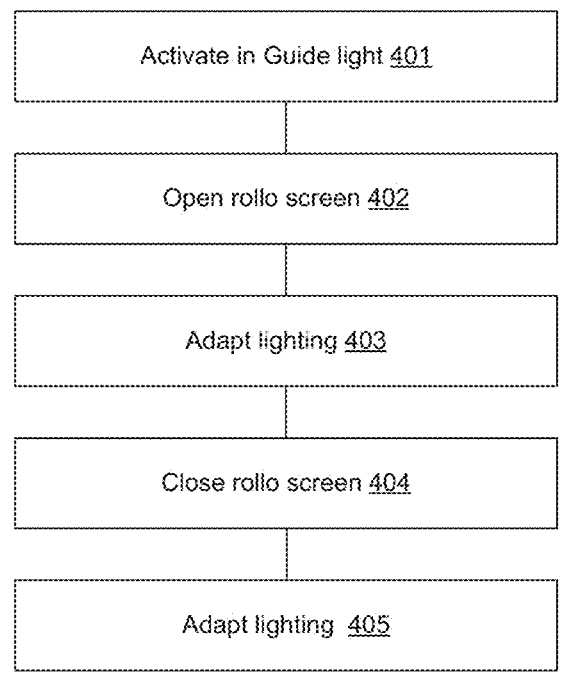
FIGS. 4A and 4B illustrate examples of a method for operating lighting in a roof and rollo assembly.

Referring to FIG. 4A, an example of a method for controlling lighting of a roof and rollo assembly is illustrated. The exemplary method will be described in relation to the examples of roof and rollo assemblies of FIGS. 1-3. As disclosed, such roof and rollo assemblies include at least one roof panel 2a, 2b provided with glass light 12, a rollo screen 21 movable between a closed position and an opened position, and in Guide Lighting 36.

When a driver gets into or prepares to get into a vehicle, e.g. when approaching the vehicle or unlocking the vehicle remotely, the vehicle and corresponding electronics and interior lighting are activated. Likewise, the in Guide Light 36 is activated 401. Depending on the circumstances, the driver may choose to open the rollo blind and press a button to do so, instruct by voice command or other user interface provided by the vehicle. Upon receiving an "open blind" signal, the method proceeds by moving 402 the rollo screen 21 in a first lengthwise direction D1 to the opened position. This may be followed, e.g. in response, with a predetermined delay, or executed simultaneously, by adapting the lighting 403, so upon moving the rollo screen 21 to the opened position, the lighting may be adapted 403 by decreasing in Guide Light 36 and increasing glass light 12.

When reversing, thus, when a driver or occupant decides to close the rollo blind, the following actions are performed. Upon receiving a "close blind" signal, moving 404 the rollo screen 21 in a second lengthwise direction D2, opposite to the first lengthwise direction D1, to the closed position. And upon moving the rollo screen 21 to the closed position, adapting lighting 405 by decreasing glass light 12 and increasing in Guide light 36. Again, the latter action may be executed simultaneously, with a predetermined delay, or in response to the moving of the rollo screen 21. Whether adapting the light when opening the rollo or closing the rollo, the adapting lighting 403, 405 includes gradually changing the amount of light emitted by the in Guide Light 36 and the glass light 12.

Figure 4B:
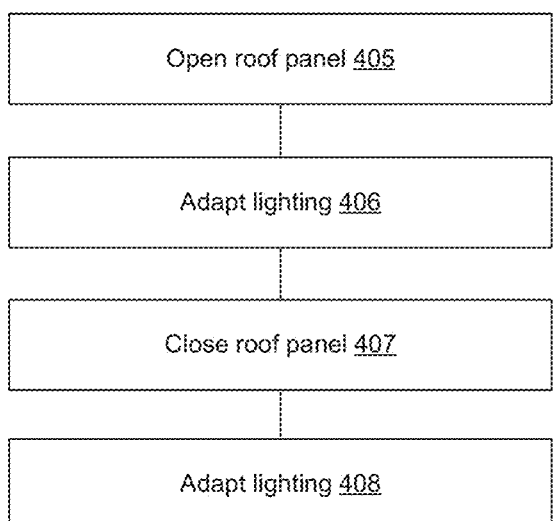

Referring to FIG. 4B, a further elaborated method is illustrated in relation to a roof and rollo assembly wherein the roof panel includes a movable panel 2a. In a vehicle equipped with such a roof and rollo assembly, the driver or occupant may choose to open the roof and command to operate the movable roof panel 2a to move to a partially or fully opened position. The method includes, upon receiving an "open roof" signal, moving the movable roof panel 2a to an opened position. And upon moving the movable roof panel (2a) to the opened position, decreasing the glass light (12). As with above described actions, this may be followed, e.g. in response, with a predetermined delay, or executed simultaneously with the moving of the movable roof panel 2a.

When reversing, thus, when a driver or occupant decides to close the roof panel, the following actions are performed. Upon receiving a "close roof" signal, moving the movable roof panel 2a to a closed position. And upon moving the movable roof panel 2a to the closed position, increasing the glass light 12. Again, the latter action may be executed simultaneously, with a predetermined delay, or in response to the moving of the movable roof panel 2a.

Figure 5:
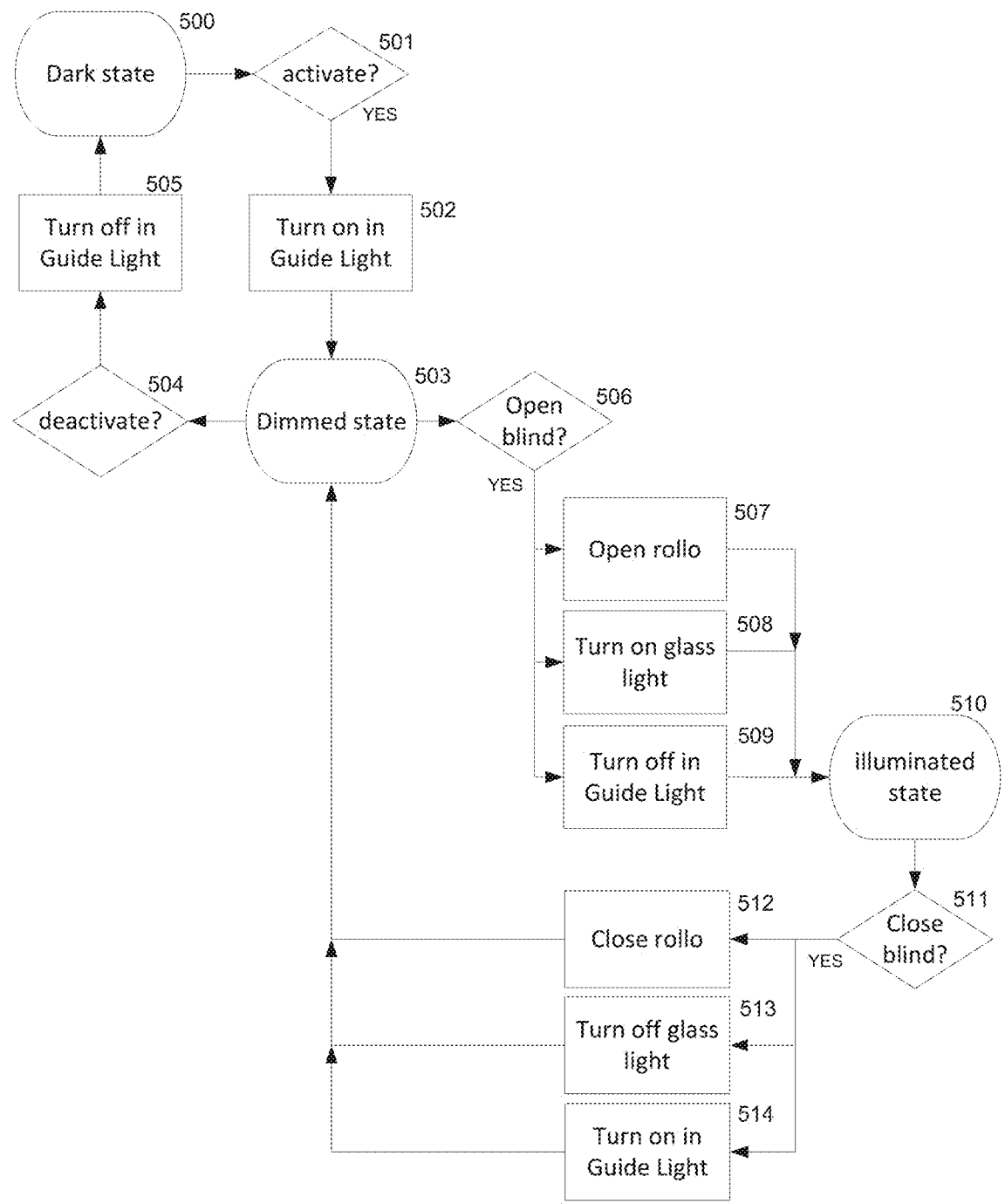
FIG. 5 illustrates a flow chart of lighting control in a roof and rollo assembly.

Referring to FIG. 5, an example of a flowchart corresponding to the method as described in relation to FIG. 4A is shown. The interior lighting of a locked or unoccupied vehicle, for example when parked, with interior lights shut off is considered to be in dark state 200. When a driver enters the vehicle or remotely unlocks the car, the general interior lighting may switch on. In response thereto, or simultaneously therewith, it may be determined that the lighting of the roof and rollo assembly is to be activated 501, and the in Guide Light is turned on 502. The lighting is then considered to be in a dimmed state 503. When in the dimmed state it is determined that a command for opening the sunblind 506 of the roof and rollo assembly is issued, the rollo screen 21 will be opened 507, the glass light 12 will be turned on 508 and the in Guide Light will be turned off 509. The vehicle, or at least the interior lighting thereof, is then considered to be in an illuminated state 510. When in the illuminated state 510 it is determined that a command for closing the sun blind 511 is issued, the rollo screen will be closed 512, the glass light will be turned off and the in Guide Light will be switched on 514, returning the interior lighting to the dimmed state 503.

When transitioning from the dimmed state 503 to the illuminated state 510 and vice versa, the turning on of one light device and turning off of the other light device is performed gradually. This gradually turning off may include that the amount of light in a first lengthwise direction D1 is diminished, while gradually turning on may include that the amount of light in a second lengthwise direction D2 is extended. Thus, the distance over which light is activated is decreased or respectively increased. This may further include that the amount of light in terms of intensity is decreased or respectively increased.

For example, if the in Guide Light is implemented using a strip containing multiple LEDs arranged lengthwise along the strip, the number of LEDs activated is increased or decreased in a direction of travel. Hence, to the occupant It appears that the light extends lengthwise along the in Guide Light, or vice versa diminishes in lengthwise direction. In another embodiment, wherein the in Guide Light is implemented as glass fiber, the amount of light coupled in at one end of is respectively slowly increased or decreased to create the effect of light extending or diminishing along the guide rail.

Similarly, when the glass light is implemented as switchable glazing having multiple segments, with the segments being arranged next to one another along the length of the vehicle, the segments may be activated consecutively as with the example of LEDs of the LED strip, in this case activating the transparency of the glass segments. Or, in another embodiment, with the glass light being implemented as Light in Glass, the location and the amount of light activated may be controlled such that it appears to flow from one edge of the glass panel to an opposite other edge. Vice versa, the deactivation of the Light in Glass may be controlled to provide a similar effect of flow perceived due to the diminishing light.

Accordingly, the light devices of the roof and of the rollo of the roof and rollo assembly may be controlled such that there is a smooth transition in the light emitted from the light devices. Preferably this allows for the total amount of light emitted to remain constant, while one light device decreases its light emitted and the other light device increases its light emitted.

Figure 6:
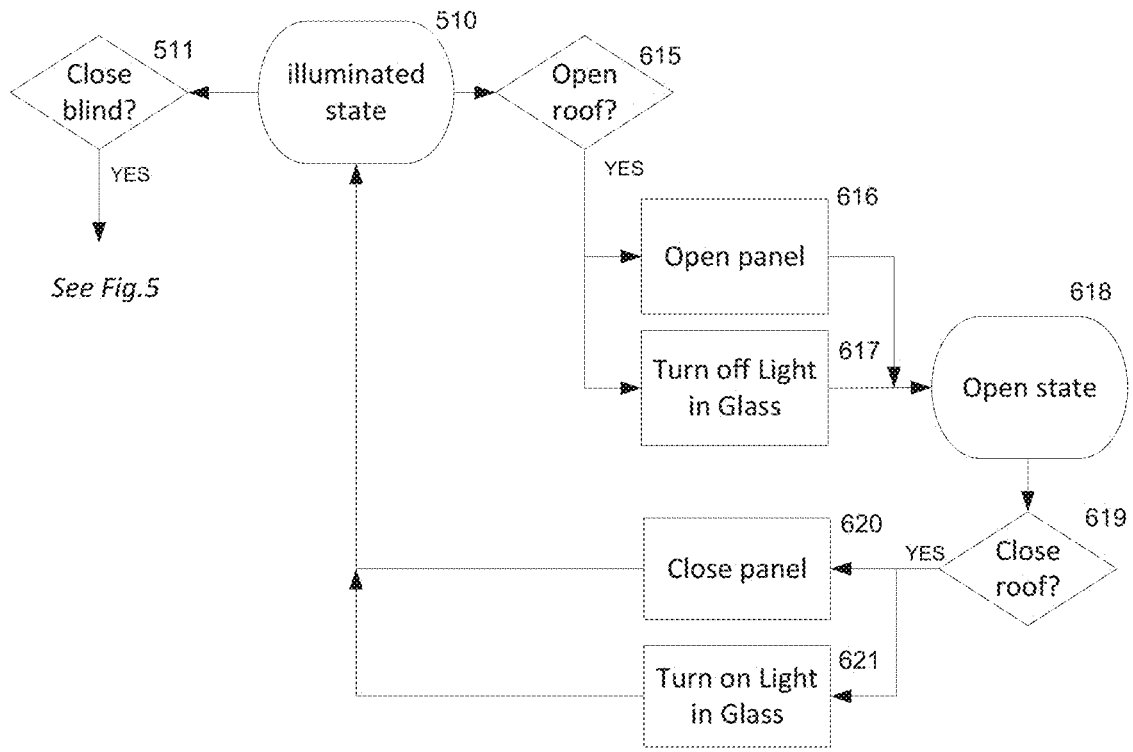
FIG. 6 illustrates a flow chart of lighting control in a roof and rollo assembly having Light in Glass.
Figure 7:
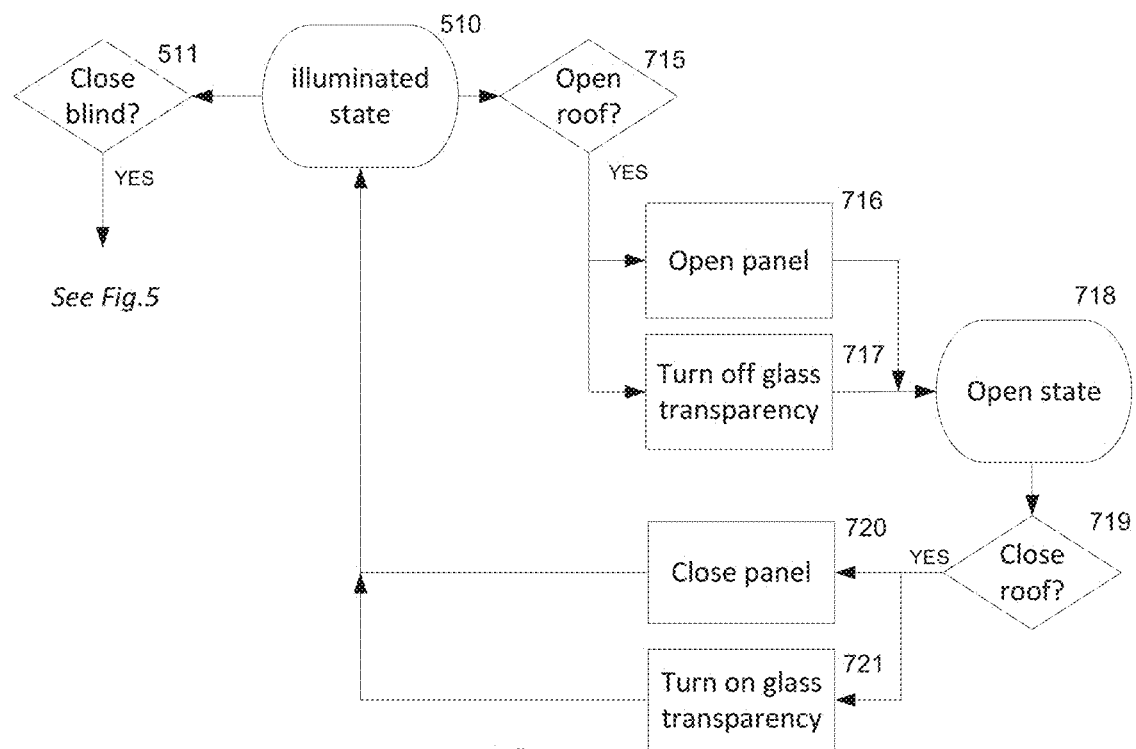
FIG. 7 illustrates a flow chart of lighting control in a roof and rollo assembly having switchable glazing.

Referring to FIGS. 6 and 7, examples of flowcharts corresponding to the method as described in relation to FIG. 4B are shown. FIG. 6 relates to a roof and roll assembly with a movable roof panel and glass light implemented by Light in Glass, while FIG. 7 relates to a roof and roll assembly with a movable roof panel and glass light implemented by switchable glazing. Referring to FIG. 6, starting from the illuminated state 510 as explained above in relation to FIG. 5, upon determining 615 that a command is issued for opening the movable roof panel 2a, the movable roof panel is opened 616 and the Light in Glass is turned off 617. The roof and rollo assembly now provides an open state 618 wherein both the rollo screen 21 and the movable roof panel 2a are in the opened position and all light devices are turned off. The rollo and roof may each either be partially or fully opened.

Upon determining 619 that a command is issued for closing the movable roof panel 2a, the movable roof panel is moved towards the closed position 620 and the Light in Glass is turned on 621. Hence, the roof and rollo assembly has returns to the illuminated state 510.

Referring to FIG. 7, starting from the illuminated state 510 as explained above in relation to FIG. 5, upon determining 715 that a command is issued for opening the movable roof panel 2a, the movable roof panel is opened 716 and the transparency of the switchable glazing is disabled 717. The roof and rollo assembly now again provides the open state 618 wherein both the rollo screen 21 and the movable roof panel 2a are in the opened position and all light devices are turned off. The rollo and roof may each either be partially or fully opened.

Upon determining 719 that a command is issued for closing the movable roof panel 2a, the movable roof panel is moved towards the closed position 720 and the transparency of the switchable glazing is turned on 721. Hence, the roof and rollo assembly returns to the illuminated state 510.

As will be understood from the example flow charts, in the method as described in relation to FIGS. 4A and 4B decreasing or increasing of the in Guide Light 36 may include respectively diminishing the amount of light in the first lengthwise direction D1 or extending the amount of light in the second lengthwise direction D2. Similarly, the increasing or decreasing of the glass light 12 may further include respectively extending the amount of light in the second direction D2 or diminishing the amount of light in the first lengthwise direction D1. When in particular the glass light 12 includes Light in Glass, increasing or decreasing the glass light 12 includes respectively increasing or decreasing the amount of light coupled into the roof panel. Whereas when the glass light 12 includes a switchable glazing panel provided with one or more activatable segments, increasing or decreasing the glass light 12 may include respectively increasing or decreasing the number of activated segments. That is the number of segments that is activated, i.e. turned on and thus provide transparency for illuminating the interior, is increased or decreased. The more segments there are, the more fluent the adaptation of the interior illumination may be. In another embodiment, wherein the roof panel includes both a movable panel and a fixed panel, the activating of segments may be still operated to create a flow of illumination similar to that for a single panel including switchable glazing or Light in Glass.

In a particular embodiment, the in Guide Light and the glass light are connected to the same power source or power supply, which allows to smoothly divert power from one light device to the other and vice versa. Accordingly, gradually changing the amount of light emitted by the in Guide Light 36 and the glass light 12 may include diverting power from the in Guide Light 36 to the glass light 12 or from the glass light 12 to the in Guide Light 36. Furthermore, the diverting of power may include controlling a power supply to gradually change the amount of power supplied to the in Guide Light 36 and the glass light 12.

Although the present invention has been described with reference to preferred embodiments, workers skilled in the art will recognize that changes may be made in form and detail without departing from the spirit and scope of the invention.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

What is claimed is:

1. A method for controlling lighting in a roof and rollo assembly, the roof and rollo assembly comprising a roof panel provided with glass light, a rollo screen movable between a closed position and an opened position, and in Guide Lighting, the method comprising:
   activating in Guide Light;
   upon receiving an "open blind" signal, moving the rollo screen in a first lengthwise direction (D1) to the opened position;
   upon moving the rollo screen to the opened position, adapting lighting by decreasing in Guide Light and increasing glass light;
   wherein adapting lighting comprises gradually changing the amount of light emitted by the in Guide Light and the glass light.

2. The method according to claim 1, further comprising:
   upon receiving a "close blind" signal, moving the rollo screen in a second lengthwise direction (D2), opposite to the first lengthwise direction, to the closed position; and
   upon moving the rollo screen to the closed position, adapting lighting by decreasing glass light and increasing in Guide light.

3. The method according to claim 1, wherein the decreasing or increasing of the in Guide Light comprises respectively diminishing the amount of light in the first lengthwise direction (D1) or extending the amount of light in the second lengthwise direction (D2).

4. The method according to claim 1, wherein the increasing or decreasing of the glass light comprises respectively extending the amount of light in the second direction (D2) or diminishing the amount of light in the first lengthwise direction (D1).

5. The method according to claim 1, wherein the glass light comprises Light in Glass; and
   wherein increasing or decreasing the glass light comprises respectively increasing or decreasing the amount of light coupled into the roof panel.

6. The method according to claim 1, wherein the glass light comprises a switchable glazing panel provided with one or more activatable segments; and
   wherein increasing or decreasing the glass light comprises respectively increasing or decreasing the number of activated segments.

7. The method according to claim 1, wherein the roof panel comprises a movable panel, the method further comprising:
   upon receiving an "open roof" signal, moving the movable roof panel to an opened position;
   upon moving the movable roof panel to the opened position, decreasing the glass light.

8. The method according to claim 1, wherein the roof panel comprises a movable panel, the method further comprising:
   upon receiving a "close roof" signal, moving the movable roof panel to a closed position;
   upon moving the movable roof panel to the closed position, increasing the glass light.

9. The method according to claim 1, wherein gradually changing the amount of light emitted by the in Guide Light and the glass light comprises:
   diverting power from the in Guide Light to the glass light or from the glass light to the in Guide Light.

10. The method according to claim 7, wherein diverting power comprises controlling a power supply to gradually change the amount of power supplied to the in Guide Light and the glass light.

11. A control unit for a roof and rollo assembly for a vehicle, configured for executing the method according to claim 1.

12. A roof and rollo assembly for a vehicle, comprising:
   a roof panel provided with glass light;
   a rollo screen movable between a closed position and an opened position;
   in Guide Light; and
   a control unit configured to:
      activate in Guide Light;
      upon receipt of an "open blind" signal, move the rollo screen in a first lengthwise direction (D1) to the opened position;
      upon movement of the rollo screen to the opened position, adapt lighting by decreasing in Guide Light and increasing glass light; and
      wherein adapting lighting comprises gradually changing the amount of light emitted by the in Guide Light and the glass light.

13. A roof and rollo assembly for a vehicle, comprising:
a roof panel provided with glass light;
a rollo screen movable between a closed position and an opened position;
in Guide Light; and
a control unit configured to:
- upon receipt of a "close blind" signal, move the rollo screen in a second lengthwise direction (D2), opposite to the first lengthwise direction, to the closed position;
- upon movement of the rollo screen to the closed position, adapt lighting by decreasing glass light and increasing in Guide light; and wherein adapting lighting comprises gradually changing the amount of light emitted by the in Guide Light and the glass light.

14. The roof and rollo assembly according to claim 12, wherein:
the roof panel comprises a movable panel, the movable panel being movable between a closed position and an opened position; and
wherein the control unit is further configured to:
- upon receipt of an "open roof" signal, move the movable roof panel to the opened position;
- upon movement of the movable roof panel to the opened position, decrease the glass light.

15. The roof and rollo assembly according to claim 12, wherein:
the roof panel comprises a movable panel, the movable panel being movable between a closed position and an opened position; and
wherein the control unit is further configured to:
upon receipt of a "close roof" signal, move the movable roof panel to the closed position;
upon movement of the movable roof panel to the closed position, increase the glass light.

* * * * *